2 Sheets--Sheet 1.

Z. D. WATERS.
Corn-Planters.

No. 140,562.    Patented July 1, 1873.

Attest:
Alex Worrall
Alexander Hay

Inventor:
Z. D. Waters by
A. W. Stout his
atty in fact

AM. PHOTO-LITHOGRAPHIC CO. N.Y. (OSBORNE'S PROCESS.)

2 Sheets--Sheet 2.

Z. D. WATERS.
Corn-Planters.

No. 140,562. Patented July 1, 1873.

Attest:
Alx Worrall
Alexander Hay

Inventor:
Z. D. Waters by
A M Stout his
atty in fact

UNITED STATES PATENT OFFICE.

ZACHARIAH D. WATERS, OF BROOKVILLE, MARYLAND.

IMPROVEMENT IN CORN-PLANTERS.

Specification forming part of Letters Patent No. 140,562, dated July 1, 1873; application filed May 20, 1873.

*To all whom it may concern:*

Be it known that I, ZACHARIAH DORSEY WATERS, of Brookville, in the county of Montgomery and State of Maryland, have invented certain Improvements in Corn-Planting Machines, of which the following is a specification:

The improvements hereinafter described are upon that class of corn-planting machines which are carried upon wheels, mounted upon axles and frames, and provided with a blade to open a furrow, and which drops the corn in regulated quantities, and do this automatically or otherwise. The first part of my invention relates to a combination of the off wheel, provided with a concentric vertical disk upon its inner face, (such disk being perforated with a series of holes at regular intervals around its inner periphery for the insertion of horizontal pins,) and of certain bars and levers to operate and regulate the operation of a dropping apparatus, all of which will be more fully described hereinafter. The second part of my invention relates to the construction of a reciprocating bar or corn-dropper, provided with a suitable opening or mouth, into which the corn is fed from the hopper or corn-box, and from which it is dropped through a suitable opening in the bottom of the corn-box as the machine travels over the ground, and a spring held in a suitable frame, which is seated upon the bottom of the hopper, in such a manner that, when the dropping-bar is drawn back, the mouth passes back from beneath the mass of corn and under that spring, which, by its softness and elasticity, prevents any hurtful grinding action upon the corn in the act of separating a mouthful or a planting from the mass. The third part of my invention relates to the combination of a forked beam, hinged at one end to the forward end of the frame, and adjustably attached at the other to the standard carrying the furrow-opener, and certain devices for raising and holding the opener up from the ground at will, and for allowing the opener to yield to stones or other obstructions rather than be broken by them, all of which will be more fully described hereinafter.

Figure 1:
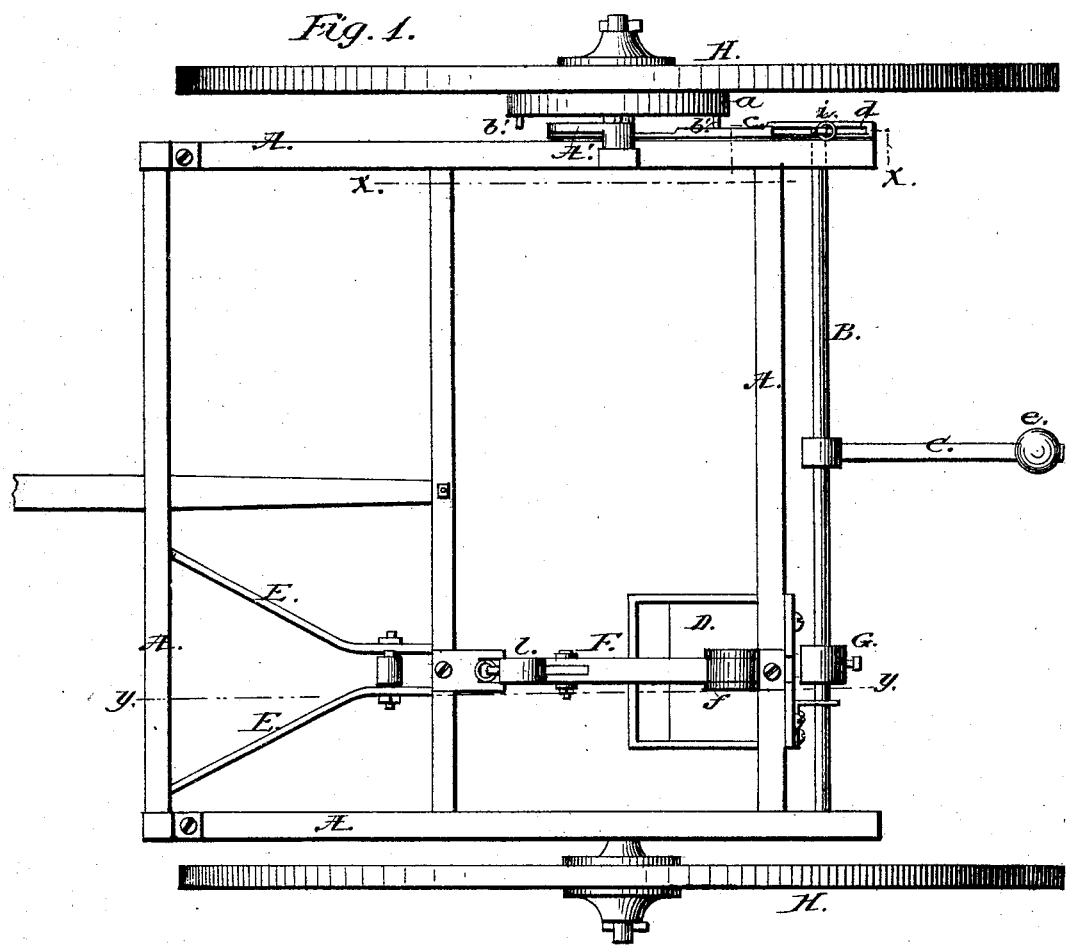
Figure 2:
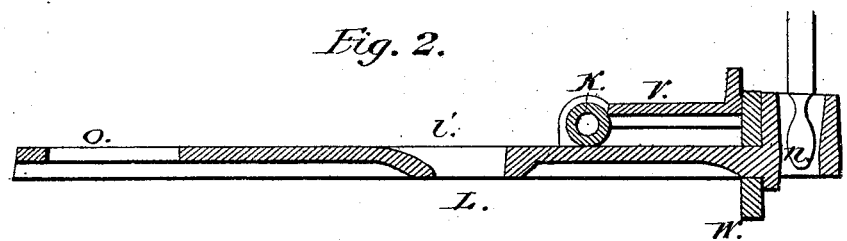
Figure 3:
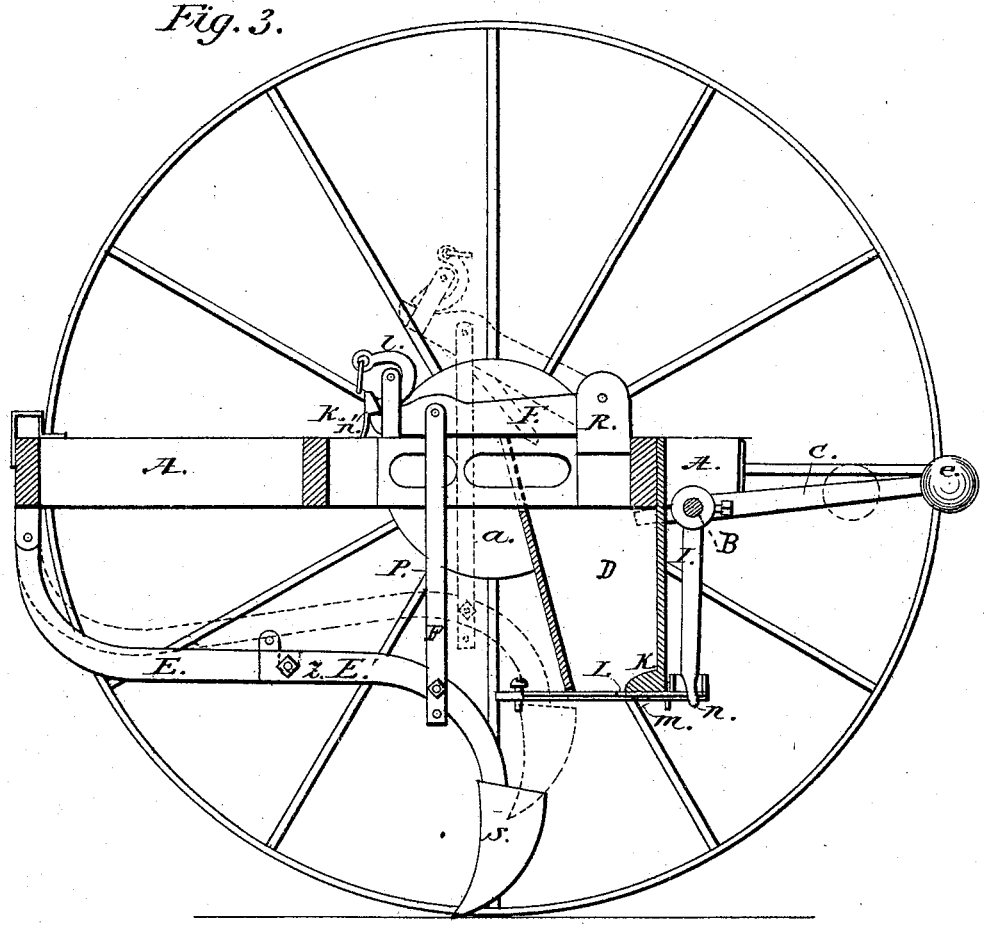
Figure 4:
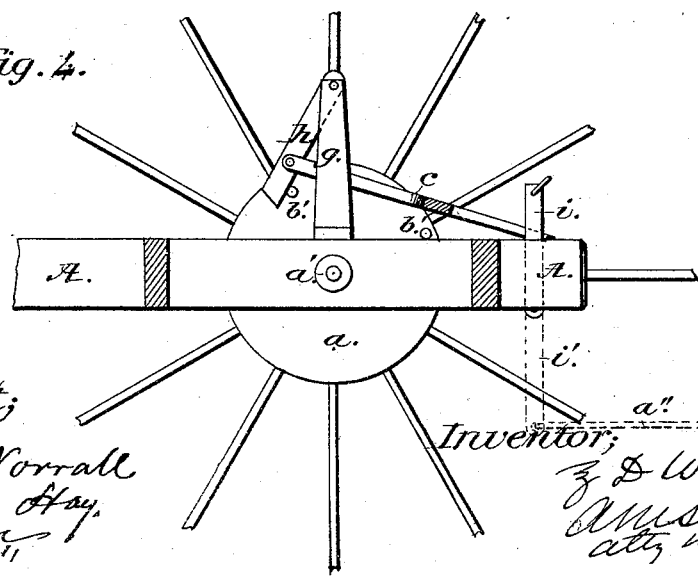

In the accompanying drawings, Figure 1 represents a plan view of a machine embracing my improvements; Fig. 2, a longitudinal vertical section of the reciprocating dropper and the spring and its frame detached from the corn-box; Fig. 3, a longitudinal vertical section of the machine made as indicated by the line $y\ y$ in Fig. 1; and Fig. 4 an inner elevation of parts of the off wheel and off side piece of the main frame, and of the operating-parts connected therewith.

A indicates the frame; H, the wheels; E, the two parts of the forked beam; S, the furrow-opener or shovel; B, the rocking bar, furnished with bearings upon the rear end of the frame; $a$, the disk upon the inner face of the off wheel, provided with a series of holes, before mentioned, for the pins $b'\ b'$. Upon the off-side piece of the frame is erected a vertical post, $g$, to the top of which is pivoted a swinging arm, $h$, and to that arm is pivoted a slotted link, $c$, having the vertical slot $d$, and in that slot is confined the upper end of standard $i$, which is fixed upright upon the off end of the rocking bar B between the wheel and the frame.

The operation of the machine is as follows: As the off wheel revolves the pins $b$ engage, successively, with the swinging arm $h$, as shown, and carry it forward, and it, by means of the link $c$ and standard $i$, rocks the rod or bar B, and, as the swinging arm $h$ lets go one of the pins $b'$, the bar B rocks back to its original position by reason of the weight of the lever C and its adjustable ball $e$, and thus the bar B is made to vibrate or rock; and, as it is connected at its rear end, by means of the lever I fixed upon and extending downward from it, with corn-dropping bar L, the latter is caused to reciprocate correspondingly, and to drop a hill of corn at each movement.

The distance of the corn-hills apart is regulated by the distance of the pins $b'$ from each other on the disk $a$.

The dropper L is provided with suitable ways on the bottom of the corn-box D through which to reciprocate; and the corn, simply by its own weight, feeds itself into the mouth $l'$ without any valve or other contrivance, and the mouthful so fed is separated from the mass by the spring K, which is simply a hollow cylinder made of soft rubber, and placed across and just over the path of the reciprocating dropper L on its own frame. When the few grains thus separated from the mass have passed back behind the spring they drop to the ground through a suitable opening in the bottom of the corn-box.

Owing to the peculiar construction of the spring and dropper, no action like that of wedging or choking can take place, and, of course, there can be no waste of power or seed.

The mouth, of course, may be varied in capacity to suit the exigencies of use.

The dropper-bar has a thick disk of soft rubber on its rear end outside of the corn-box, and is confined in its position by a shoulder, as shown. Now, when the dropper is driven forward this rubber disk acts as a buffer, and serves to modify the action of the dropper and facilitate the filling of the mouth $l'$, and the detaching of its contents from the mass of corn in the hopper.

Now, as to the third part of my invention: By forcing back the crooked lever $i'$ the spring-catch $n'$ is bent forward, and the lever F, which is pivoted at R, may be raised, and with it, by means of the link P, the standard E', beam E with shovel S, so that the whole will occupy the position shown by broken lines in Fig. 3, above the ground, and by a single catch-brace, as indicated in the same figure, it may be held there.

The beam E and standard E' are pivoted together by the bolt $z$, and forward of that bolt is another inserted through both to make their connection rigid; and that bolt may be made of wood, and of just sufficient strength to insure its breaking, in case of obstruction, before the furrow-opener itself would break.

The corn-box should be long enough to extend down near to the ground, in order to drop and deliver the corn with accuracy.

If the ground shall have been laid off one way, then, to check off and plant, the automatic arrangement may be dispensed with, and the bar B be operated by hand by means of the rod $i$ and strap $a^2$ in the hands of the operator.

I am aware of the patent granted to William H. Fish, Jr., for "improvement in corn-planters," dated May 12, 1868, and do not claim any of his combinations of devices, but confine myself to my own; and, therefore,

What I claim as my invention is—

1. The combination of the disk $a$ on the off wheel, pins $b'$, swinging arm $h$, slotted link $c$, as coacting devices for rocking the bar B, provided with a standard, $i$, and weights C and $e$, each constructed and all arranged substantially as shown and described.

2. The combination of the dropper L, having the mouth $l'$, and the India-rubber spring K, seated in the corn-box D, constructed and arranged substantially as and for the purpose described and set forth.

3. The combination of the dropper L, having the mouth $l'$, and the said India-rubber buffer W, constructed and arranged substantially as shown and described, for the purpose set forth.

4. The combination of the dropper L, link I, corn-box D, and rocking bar B, substantially as and for the purpose above set forth.

5. The combination of the crooked lever $i$, the spring-catch $n'$, lever F, link P, beam E, and standard E', each constructed and all arranged substantially as and for the purpose set forth.

In testimony that I claim the foregoing I have hereunto set my hand this 13th day of May, 1873.

Z. D. WATERS.

Witnesses:
 EDM. F. BROWN,
 S. S. STOUT.